United States Patent

[11] 3,550,560

[72] Inventor William E. Edstrom
 Rte. 1, Box 4, Waterford, Wis. 53185
[21] Appl. No. 822,561
[22] Filed May 7, 1969
[45] Patented Dec. 29, 1970

[54] ANIMAL DRINKING DEVICES
 10 Claims, 3 Drawing Figs.
[52] U.S. Cl. .................................................. 119/72.5
[51] Int. Cl. ........................................................ A01k 07/00
[50] Field of Search............................................ 119/72.5, 75

[56] References Cited
UNITED STATES PATENTS
3,410,249 11/1968 Allen et al. .................... 119/72.5X
3,476,088 11/1969 Smith ............................. 119/72.5
3,507,255 4/1970 Allen............................... 119/72.5

Primary Examiner—Hugh R. Chamblee
Attorney—Morsell & Morsell

ABSTRACT: An animal-watering device including an upper fitting and a tubular lower fitting with a resilient, apertured diaphragm therebetween which pressurably bears on the top surface of a valve head having a downwardly-extending stem adapted to be pivoted laterally by an animal to cause said valve head to cant on a resilient valve seat and simultaneously deflect said apertured diaphragm to allow water to flow therethrough and downwardly around said canted valve head to the animal, the tension created by said resilient diaphragm causing said valve head to resume its sealing engagement with the valve seat upon the release of said stem, surface tension causing water to be retained between said valve stem and tubular fitting to aid an animal in locating the water supply.

INVENTOR
WILLIAM E. EDSTROM

BY

*Morsell & Morsell*

ATTORNEYS

ANIMAL DRINKING DEVICES

BACKGROUND OF THE INVENTION

1. Field of the Invention

The present invention relates to watering devices for animals, and particularly to a self-watering device for rodents such as mink, chinchillas, guinea pigs, rats, rabbits, and even poultry or other fowl.

2. Description of the Prior Art

In the past the conventional method of supplying drinking water to animals, and particularly to small animals such as mink and the like, was to merely fill open top containers or troughs with water. Such containers must be periodically refilled, of course, which necessitates costly labor, and, in addition, the water in such open top troughs or containers becomes relatively dirty and even unsanitary, which can lead to the spread of contagious diseases among the animals. Further, in those areas of the country wherein water is at a premium it is important that means be provided to conserve water and eliminate its wasteful use.

With these considerations in mind, a number of enclosed self-watering devices for rodents and other small animals and fowl have been designed in recent years, but unfortunately, they have not proven entirely satisfactory for their intended purposes.

For one thing, most of the self-watering devices presently available for mink and other small animals are relatively complicated to operate, employing valve stems or the like which must be moved axially in order to initiate the water flow, and it is difficult if not impossible for the animals to learn to use such devices. In addition, the complex design and construction of most of said prior self-watering devices renders the same relatively expensive to manufacture, which makes their use prohibitive in many large-scale fur ranching operations.

A further disadvantage of prior drinking devices utilizing axially-movable valves is that the water pressure in the system must be maintained relatively low in order to permit the animal or fowl to open said valve against the pressure of the water, and due to such low pressure thereon any little particle that gets lodged under the valve seat is likely to cause leakage.

Examples of prior animal drinking devices of the general types hereinabove described are disclosed in the following U.S. Pat. Nos. 2,486,729; 2,845,046; 3,263,652; 3,215,119; 3,118,426; and 3,410,249.

SUMMARY OF THE INVENTION

The present invention comprises a new and improved self-watering device for small animals which utilizes a laterally-movable stem and tiltable valve head that provides substantially greater mechanical advantage than is obtained with the axially-movable valve stems employed in conventional animal watering devices, thus permitting the use of a resilient diaphragm to provide increased sealing pressure to reduce leakage while nevertheless permitting the valve to be more easily opened by an animal than said prior, axially-movable valve assemblies.

A further object of the invention is to provide an animal watering device having a laterally-pivotal valve stem which is carried in a depending tubular housing having a lower end opening formed on a bias and especially designed for rodents and similar animals which by nature are prone to bite against the valve-actuating stem, in contrast to prior animal watering valve devices wherein axially-movable valve stems or actuating members are employed.

A further object is to provide a new and improved animal watering device which is especially designed to utilize the water adhesion properties and surface tension of the interfitting valve stem and tubular stem housing to retain water therebetween to facilitate the location of the water by the animals.

A further object of the present invention is to provide a new and improved self-watering device for animals which is simple and economical in design and construction, said device being constructed entirely of standard parts and requiring no special castings or machining, thereby providing a unit which can be manufactured for substantially less cost than the self-watering devices heretofore available.

Still further objects of the present invention are to provide an improved animal self-watering device which is rugged and durable in construction and requires a minimum of care and maintenance, and which device is otherwise particularly well adapted for its intended purposes.

BRIEF DESCRIPTION OF THE DRAWING

In the accompanying drawing, wherein there is illustrated one complete embodiment of a preferred form of the invention, and wherein the same reference numerals designate the same parts in all of the views.

DESCRIPTION OF THE PREFERRED EMBODIMENT

Figure 1:
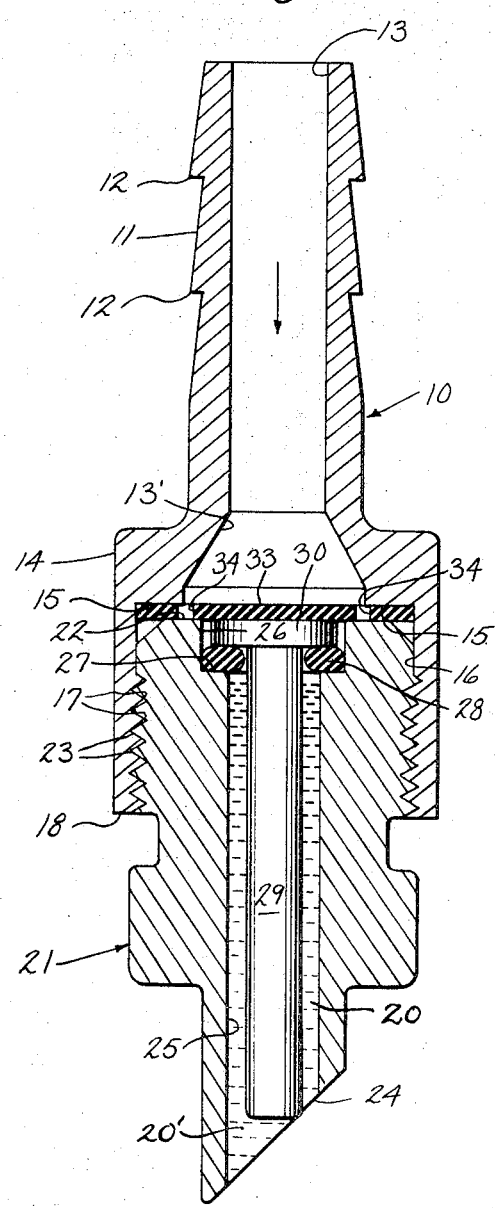
FIG. 1 is a vertical sectional view of the improved animal watering device in its closed, inoperative position.

Referring now more particularly to the drawings, the novel self-watering device for animals comprising the present invention includes a generally tubular upper fitting or so-called valve cap 10 having an upright portion 11 with a bore 13 extending therethrough. A plurality of downwardly-facing, barblike annular protuberances 12 are formed on and around the exterior of said upright portion 11. In the complete assembly a water hose (not shown) leading from a suitable supply of drinking water is wedgingly fitted over said tubular portion 11, and said annular protrusions 12 function to securely maintain said hose in tight, leakproof engagement thereon.

The lower end of the valve cap 10 includes an enlarged base portion 14 within which the bore 13 is enlarged and flared outwardly, as at 13'. Said bore portion 13' communicates with a still larger bore 16 opening in the bottom of said valve cap and having threading 17 formed therein, there being an annular, downwardly-facing shoulder 15 formed between said communicating bores 13' and 16. Preferably the interior shoulders, corners, and edges in the present unit are rounded slightly to eliminate sharp edges which might cut or damage the resilient sealing members, as will be seen, although this is not a critical feature of the invention.

Threaded into said valve cap 10 in the present invention is a lower tubular member or fitting 21 having external threading 23, and having a flat upper end face 22 which is spaced somewhat below the aforementioned internal shoulder 15 formed in the interior of said valve cap when said lower member is fully inserted therein.

The lower end 24 of said tubular member 21 is beveled, as shown, and formed in and through said member is a vertical bore 25. The upper end 26 of said bore 25 is enlarged, thereby forming an internal, upwardly-facing annular shoulder 27, and said bore 26 opens in the top of said member 21 in registration with the bore portion 13' of the valve cap thereabove, the latter bore being of somewhat larger diameter than said lower member bore 26. Seated on the annular shoulder 27 and closely fitted within the bore portion 26 of said member 21 is a resilient O-ring 28 formed of rubber or rubberlike material, the function of which is to provide a resilient valve seat as will be hereinafter seen.

Mounted within the bore 25 in the lower fitting 21 is a valve member including an elongated stem 29 which extends downwardly in said tubular fitting, as shown, and formed on the upper end of said valve stem is an enlarged, flat circular head 30 which normally seats in flat, sealing engagement on the aforementioned resilient O-ring 28, as illustrated in FIG. 1. Said valve head 30 is of a smaller diameter than the enlarged bore portion 26, thereby providing an annular space therebetween.

Figure 3:
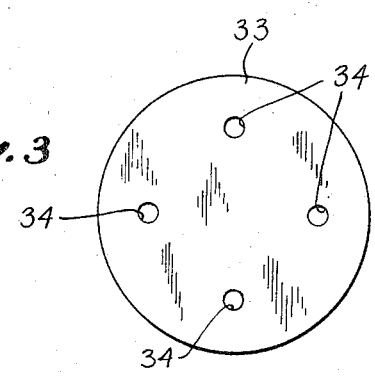
FIG. 3 is a plan view of the sealing diaphragm utilized in the invention.

Clampingly retained in the space between the top surface of the lower fitting 21 and the annular shoulder 15 thereabove is a resilient circular diaphragm 33 which is of a diameter to closely fit within the bore 16, and which diaphragm includes a plurality of spaced apertures 34 therethrough (FIG. 3) which are so located as to normally be positioned immediately over the top surface 22 of said lower fitting, as illustrated in FIG. 1. Said resilient diaphragm 33 is adapted to be stretched and deflected in response to tilting movement of the valve head 30 during the operation of the present watering device to allow water to pass therethrough, as will not be described, as well as functioning as a trainer to prevent large foreign particles from becoming lodged between the valve head 30 and O-ring seat 28 and causing leakage therebetween.

In the use of the present invention drinking water from a tank, reservoir, or other suitable source ordinarily located from 1 to 10 feet above the drinking device is supplied to the valve cap 10 by means of a suitable connecting hose or the like (not shown) telescopically mounted thereon. The diaphragm 33, which is clampingly retained between the shoulders 15, 22, prevents said water from finding its way downwardly between said threaded interfitting upper and lower fittings 10, 21.

Drinking units of the present type are generally used where the animals are housed in individual cages, there being a unit clipped onto each of the cages and all of said drinking devices being supplied from the same tank or reservoir. Preferably the drinking unit will be clipped onto the cage in a position whereby only the bottom portion of the lower fitting, and the downwardly-extending valve stem, project into the cage.

Figure 2:
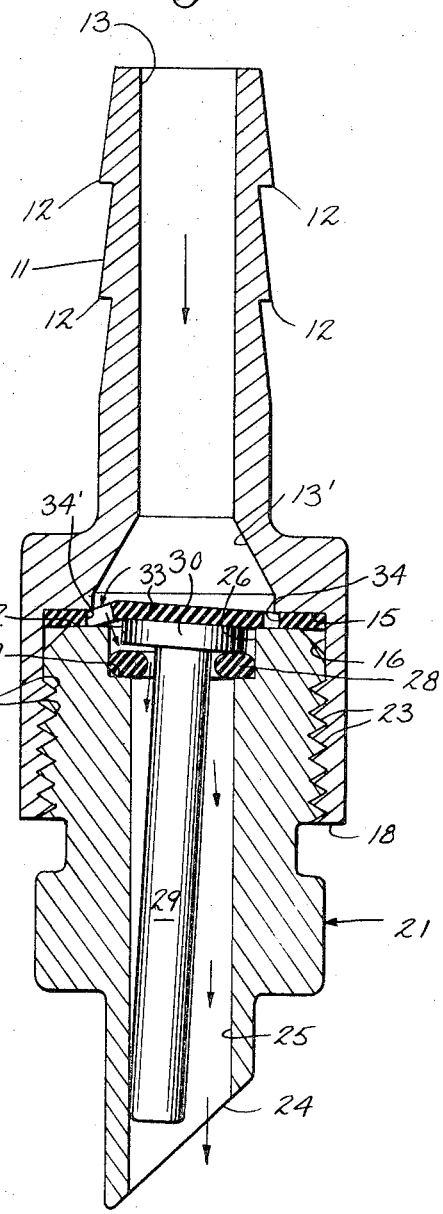
FIG. 2 is a similar sectional view showing the device in its open condition.

With reference now to FIG. 2 of the drawing, when a mink or other animal wishes to obtain a drink of water it has merely to bite against the lower end of the valve stem 29, and the lateral pressure thus applied to said valve stem by the animal causes said stem to pivot sideways within the limits prescribed by the diameter of the bore 25, as illustrated, thereby canting or tilting the valve head 30 against the tension of the resilient diaphragm 33 (and the water pressure thereon) and causing at least one of the diaphragm apertures, such as the aperture 34', to be raised away from the top surface 22 of the lower fitting. The canting of said valve head 30 is promoted by the resilient nature of the O-ring valve seat 28, and as said valve head assumes an angled position clearance is provided between the side of said O-ring opposite the pivot point and the underside of said valve head. Thus, as indicated by the directional arrows in said FIG. 2, the water carried in the upper member 10 is enabled to flow downwardly through one or more of said diaphragm apertures, around and downwardly past the canted valve head 30, through the central opening in said O-ring 28, and downwardly through the vertical bore 25 in the lower fitting 21 to the mouth of the animal.

When the animal has quenched its thirst and releases the valve stem 29 the resiliency of the diaphragm 33, together with the water pressure thereabove, returns said valve head to its original, sealing position on the valve seat, thereby preventing further flow of water through the valve and eliminating waste.

An important feature of the present device is that in the event the water pressure in the system should be greater than normal the compression on the resilient valve seat 28 is correspondingly increased and when the valve stem is moved to open the valve the increased springback tendency or expansion of said O-ring on the side opposite the pivot point reduces the size of the opening through which the water can flow. Thus a relatively constant flow volume is obtained regardless of the water pressure in the system. This is in contrast to most conventional self-watering devices wherein an opening or passageway of constant size is provided and wherein an increase in water pressure produces a corresponding increase in the flow rate. With such conventional valves, under increased water pressure conditions the water can rush out and splatter the animal, which is very undesirable.

A further disadvantage of many of said prior animal-watering valves is that they utilize a conical valve seat and it has been found that suction is created which frequently causes the valves to stick. In the present invention, on the other hand, there is no possibility of a suction cup effect between the valve head 30 and the O-ring valve seat 28, and a comparable sticking problem is nonexistent.

As hereinabove mentioned, the present drinking device is especially designed for animals of the rodent type. By nature such animals are prone to bite the valve-actuating mechanism, rather than to push or nudge the same, and for this reason the lateral stroke characterizing the valve stem 29 in the present unit provides an actuating mechanism that is much simpler for the animals to learn to manipulate than the axially-movable valve units heretofore employed.

With the axially-movable valves utilized in prior animal-watering devices the required operating force is directly proportional to the water pressure on the valve head since to open the valve it is necessary to push directly upwardly against the water pressure bearing on the entire surface area of the said valve head. The result is that with such conventional valve devices the water pressure in the system must be maintained relatively low in order to allow the animal or fowl to actuate the valve. With such low sealing pressure on the valve assembly it is relatively easy for small foreign particles to become lodged in the valve seat and cause leakage. With the present invention, on the other hand, the diaphragm 33 maintains considerable pressure on the resilient valve components to provide tight engagement therebetween regardless of the water pressure in the system and only particles or stones of substantial size can affect the leakproof seal thus provided, thereby minimizing the possibility of leakage or dripping.

A further important innovation incorporated in the present invention is that the relative diameters of the valve stem 29 and surrounding bore 25 of the lower fitting are such that due to the adhesion and surface tension properties thereof a quantity of water will span and be retained between said valve stem and the surrounding wall after the valve has been closed, as designated by the numeral 20 in FIG. 1. In fact, due to the angled design of the lower end of said tubular member and the fact that a portion thereof extends below the bottom of said valve stem, some water will be present below said stem, as indicated at 20', thus making it an easy matter for the animal or poultry to locate said surface-adhering water when seeking a drink. In its effort to obtain the water the animal or fowl will naturally engage the valve stem and urge the same laterally, thereby opening the valve. It has been found, in fact, that with the present invention even the most slow-witted animals are able to learn the valve-operating procedure in a short time, which is not true of many of the push-type and other relatively complex self-watering devices heretofore available wherein the animal must learn to shift the actuating mechanism axially.

The angled, downwardly-extending nature of the tube lower end in the present structure is also important in watering devices for rodents and the like in that it enables such animals to bite against the valve stem when they wish a drink, while detering them from playing with and indiscriminately actuating said valve stem.

Further advantages of the present invention are that in addition to eliminating the task of repeatedly filling individual containers with water, which is time consuming and expensive particularly in large scale fur ranching operations, with the present completely enclosed drinking unit the possibility of the water becoming dirty or contaminated is eliminated. Further, the wasteful use of water in areas where it is a precious commodity is avoided. In addition, the present unit is formed entirely of standard parts and does not require any special expensive castings or machining, thereby minimizing manufacturing costs, and it is a durable unit which does not require frequent repair or servicing.

It is to be understood that while one preferred embodiment of the present invention has been illustrated and described herein, numerous variations or modifications therein may occur to those having skill in this art and what is intended to be covered herein is not only the illustrated form of the invention, but also any and all modified forms thereof as may come within the spirit of said invention.

I claim:

1. A drinking device for animals, comprising: an upper portion adapted to contain drinking water; a communicating lower portion with a downwardly-extending tubular member having an open lower end; a resilient, deflectable apertured diaphragm interposed between said upper and lower portions; a valve seat located below said resilient diaphragm, said valve seat having an opening therethrough; a valve head adapted to sealingly engage on said valve seat and bearing against the underside of said resilient diaphragm; and an elongated valve stem extending downwardly from said valve head through said lower tubular member to a point adjacent the lower end thereof, said valve stem being pivotal laterally in response to engagement of its lower end portion by an animal to cause said valve head to cant against the tension of said resilient diaphragm and to thereby provide clearance between said valve head and seat elements to permit water to flow from said upper portion through said apertured diaphragm, around and past said canted valve head through the opening in said valve seat, and downwardly through said tubular member to the animal, the tension of said resilient diaphragm thereon causing said valve head to resume its sealing position on the valve seat and halting the flow of water upon release of the valve stem by the animal.

2. The device recited in claim 1 wherein said valve stem and surrounding tubular member are of predetermined relative diameters whereby water will span said members and be retained therebetween by surface tension and adhesion after said valve has been closed to facilitate the subsequent location of the water and actuation of the valve by an animal.

3. The device recited in claim 2 wherein the lower, open end of said tubular member is formed on an angle and wherein said downwardly-extending valve stem terminates above the bottommost point of said tubular member, whereby a portion of the water retained by surface tension between said valve stem and tubular members extends below said stem lower end to promote the location of said water by an animal, and wherein the angled and downwardly-extending nature of said tubular member bottom portion deters the animal from playing with said valve stem lower end.

4. The device recited in claim 1 wherein said valve seat is in the form of a resilient and deflectable O-ring.

5. The device recited in claim 4 wherein said resilient O-ring valve seat is so designed that the water passageway provided thereby when said valve head is canted is inversely proportional to the water pressure on said valve seat to maintain a relatively constant water flow.

6. The device recited in claim 4 wherein said diaphragm is adapted to exert sufficient sealing pressure on said valve head and resilient valve seat to provide sealing engagement therebetween regardless of the water pressure in the system.

7. The device recited in claim 6 wherein the sealing pressure exerted on said valve head by said diaphragm is sufficient to provide leakproof sealing engagement between said valve head and resilient seat despite the presence of small foreign particles therebetween.

8. The device recited in claim 1 wherein said diaphragm is adapted to strain out and prevent large foreign particles from becoming lodged between said valve head and seat members.

9. The device recited in claim 1 wherein said upper and lower portions are separable to permit the same to be disengaged to provide access to the diaphragm and valve elements therein if necessary.

10. A self-watering device for animals, comprising: an upper fitting containing drinking water, there being an axial bore therethrough and a base with an enlarged bore portion forming a downwardly-facing annular internal shoulder; a lower fitting threaded upwardly into said upper fitting having a top end face spaced immediately below said upper fitting annular shoulder and having a tubular lower portion, there being an axial bore extending through said lower fitting with an enlarged portion opening in the upper end thereof and forming an upwardly-facing, annular valve seat shoulder; a resilient O-ring valve seat positioned on said shoulder; a resilient deflectable diaphragm mounted between the top face of said lower fitting and the downwardly-facing annular shoulder in said upper fitting, said diaphragm having a plurality of apertures therethrough; a valve mounted in said lower fitting including a valve stem projecting downwardly to a point adjacent the lower end of said fitting, and said valve including a head seated on said resilient O-ring and in engagement with the underside of said diaphragm, said valve stem lower, projecting end being pivotal laterally in response to engagement by an animal seeking a drink, such pivotal movement of the valve stem lower end causing said valve head to cant against the tension of said resilient diaphragm to permit water from said upper fitting to flow downwardly through one or more of said diaphragm apertures, around said canted valve head, through the opening in said O-ring, and downwardly through the tubular lower fitting to the animal, the resiliency of said diaphragm together with the water pressure thereon causing said valve head to return to its sealing position relative to said valve seat and halting the flow of water upon the release of the valve stem lower end by the animal.